United States Patent [19]

Lindoff

[11] Patent Number: 5,179,724

[45] Date of Patent: Jan. 12, 1993

[54] CONSERVING POWER IN HAND HELD MOBILE TELEPHONES DURING A RECEIVING MODE OF OPERATION

[75] Inventor: Mats E. G. Lindoff, Lund, Sweden

[73] Assignee: Ericsson G.E. Mobile Communications Holding Inc., Paramus, N.J.

[21] Appl. No.: 641,256

[22] Filed: Jan. 15, 1991

[51] Int. Cl.[5] .......................... H04B 1/44; H04B 1/16
[52] U.S. Cl. ...................... 455/76; 455/127; 455/343
[58] Field of Search ............ 455/343, 76, 83, 341, 455/342, 250, 251, 127, 250.1, 251.1, 194.2, 234.1, 234.2, 245.1; 330/296, 129

[56] References Cited

U.S. PATENT DOCUMENTS

| | | | |
|---|---|---|---|
| 4,435,846 | 3/1984 | Weise | 455/343 |
| 4,631,496 | 12/1986 | Borras et al. | 455/76 |
| 4,631,737 | 12/1986 | Davis et al. | 455/343 |
| 5,001,776 | 3/1991 | Clark | 455/343 |

FOREIGN PATENT DOCUMENTS 54-119819  9/1979  Japan .................... 455/343

Primary Examiner—Reinhard J. Eisenzopf
Assistant Examiner—Lisa Charoud
Attorney, Agent, or Firm—Burns, Doane, Swecker & Mathis

[57] ABSTRACT

In a radio communication system such as a cellular telephone system having battery powered mobile stations which receive radio frequency signals, an amplifier in the receiver of the mobile station is operated in a plurality of different modes in order to reduce power consumption. The modes of the amplifier depend upon the strength of the incoming signal and whether the transmitter is transmitting. The receiver is also periodically disconnected from the battery in order to further reduce power consumption.

7 Claims, 3 Drawing Sheets

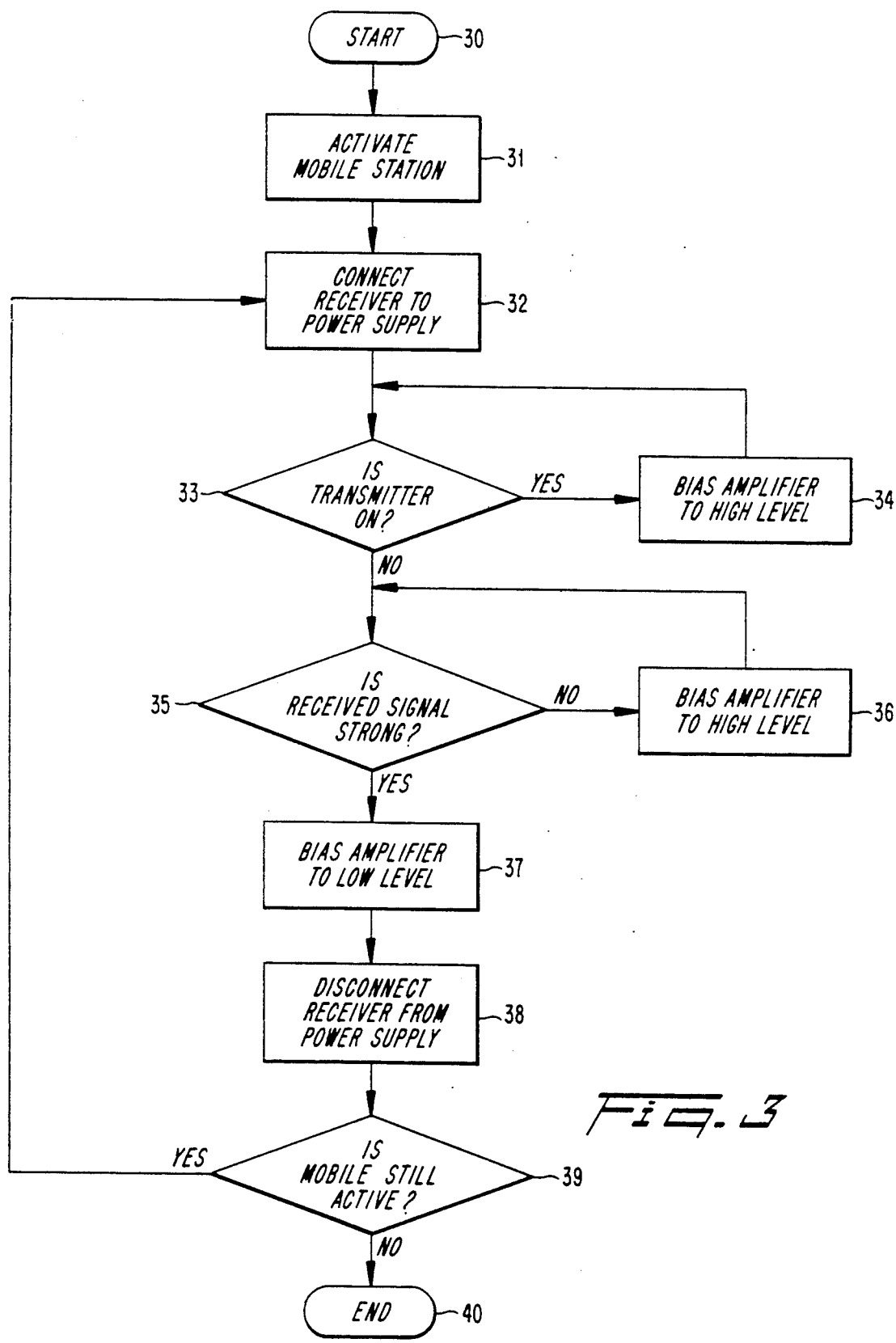

CONSERVING POWER IN HAND HELD MOBILE TELEPHONES DURING A RECEIVING MODE OF OPERATION

FIELD OF THE INVENTION

The present invention relates generally to mobile radio communications systems which include hand held telephones. More particularly, the invention relates to a method and apparatus for reducing electrical power consumption when operating a hand held cellular telephone.

BACKGROUND OF THE INVENTION

A cellular telephone system is a radio communication system in which a plurality of mobile stations operate within a cell which is serviced by a base station. There are typically a relatively large number of cells and base stations in a given service area. The base station in each cell is connected to a message switching center which in turn is connected to a public telephone system.

A recent innovation in the field of mobile radio communications is the hand held or "pocket" telephone concept. These telephones are extremely light weight, battery operated telephones that can be transported by an individual. One of the major design constraints for "pocket" telephones is the weight of such devices. These devices typically include a transceiver unit, a rechargeable battery and a whip antenna. The weight of the battery is a substantial portion of the total weight of the device. The battery must be of sufficient size to power the "pocket" telephone for a useful length of time. A relatively heavy battery enables the pocket telephone to be powered for a longer period of time, but it reduces the transportability of the "pocket" telephone. A lighter battery unit increases the transportability of the "pocket" telephone, but it reduces the useful operating time of the device between recharges.

In the field of mobile radio communications, it is well known that the electrical power consumption of the receiver can be reduced by periodically disconnecting the receiver from the battery during predetermined time periods. Typically, such battery saving devices disconnect the receiver from the battery for a period of several milliseconds. The receiver is then reconnected to the battery for a period of several milliseconds, and the receiver is capable of monitoring a control channel or receiving an incoming call. When a telephone call is established, the receiver is continuously connected to the power supply. After completion of the call, the receiver is again alternately connected and disconnected from the power supply. During the idle mode or the relatively long periods in which no calls are being made or received by the mobile station, substantial amounts of electrical energy can be conserved by disconnecting the receiver from the power supply.

One of the major components within the receiver of a mobile station that consumes substantial amounts of electrical energy is the amplifier. If the amount of power consumed by the amplifier can be reduced, the size of the battery can be made even smaller or alternatively the time between recharges can be further increased. Accordingly, there is a need for an improvement in the operation and structure of the amplifier in the receiver of a "pocket" telephone.

SUMMARY OF THE INVENTION

The present invention relates to a method of reducing electrical power consumption in a battery operated mobile station such as a "pocket" telephone. The battery operated mobile station includes a transceiver unit having a receiver and a transmitter that are responsive to frequency synthesizers. The receiver receives a radio frequency signal and applies it to an amplifier which is controlled by a processing circuit such as a suitably programmed microprocessor. The amplifier is capable of operating in three different modes. In the first mode the amplifier is biased to a relatively high level whenever the transmitter is transmitting. In the second mode, the amplifier is biased to a relatively high level when the transmitter is turned off, and the receiver is receiving a relatively weak radio frequency signal. In the third mode, the amplifier is substantially disabled when the transmitter is turned off, and the receiver is receiving a relatively strong radio frequency signal. The three modes of operation for the amplifier are controlled by the microprocessor. The output of the amplifier is applied to a mixer which mixes the received radio frequency signal with the output of the frequency synthesizer associated with the receiver. The output of the mixer is then applied to an intermediate frequency stage and is processed in a conventional manner.

BRIEF DESCRIPTION OF THE DRAWINGS

FIG. 3 is a flow chart of the software used by the microprocessor to control the receiver.

DETAILED DESCRIPTION OF THE INVENTION

Figure 1:
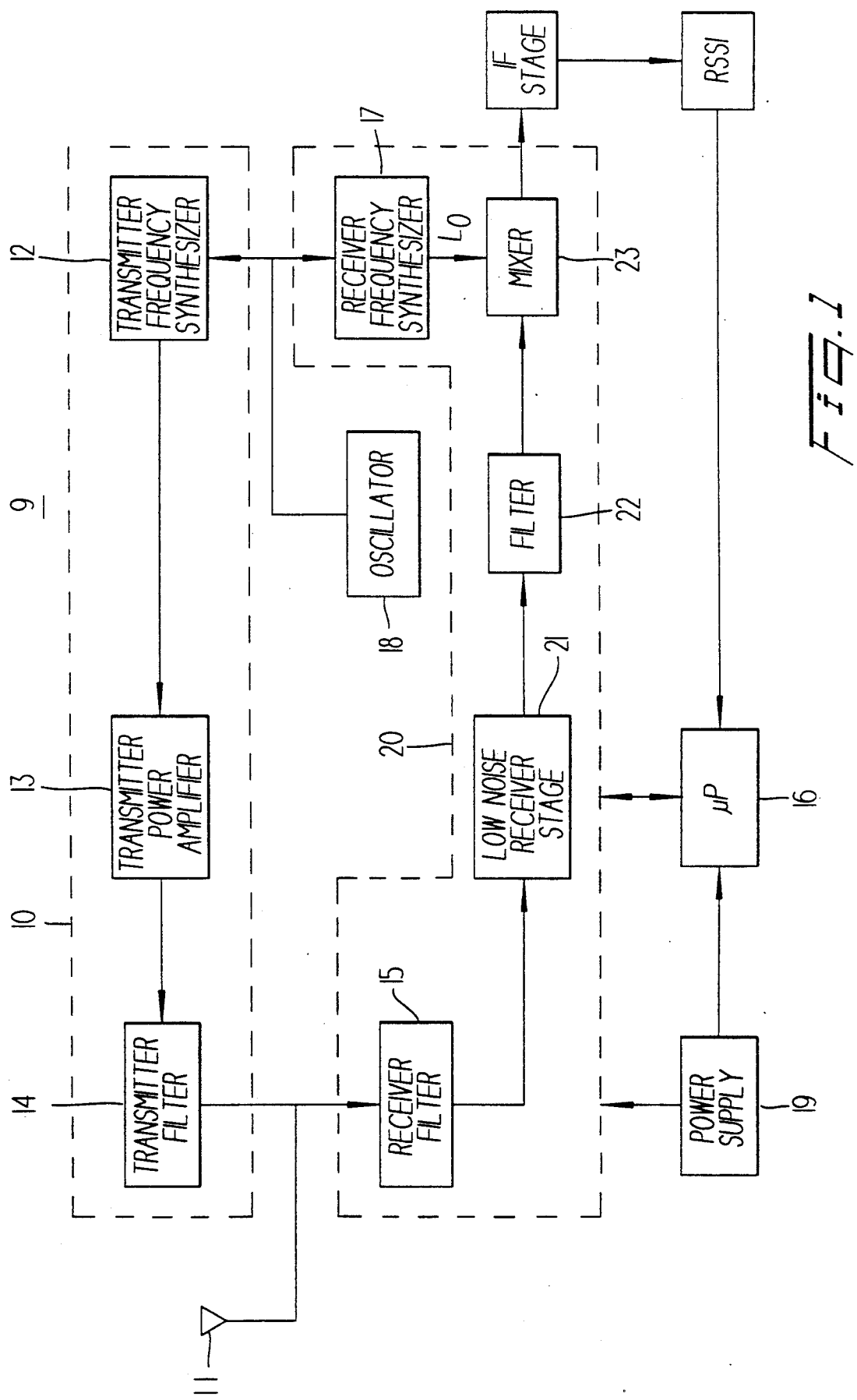
FIG. 1 is a block diagram which illustrates a mobile radio communication apparatus that utilizes the present invention.

FIG. 1 illustrates a block diagram of a mobile cellular telephone associated with the present invention. Although they are particularly suited for use in portable "pocket" telephones, the principles of the present invention are applicable to any type of mobile telephone in which reduction of power consumption is desirable. The cellular telephone 9 of the present invention includes a transceiver having a transmitter 10 and a receiver 20 which are coupled to a common antenna 11. A transceiver oscillator 18 is coupled to a transmitter frequency synthesizer 12 and a receiver frequency synthesizer 17. The output of the transmitter frequency synthesizer 12 is applied to a transmitter power amplifier 13. The output of the transmitter power amplifier 13 is filtered by a transmitter filter 14 and is broadcasted through the antenna 11.

The receiver 20 receives incoming radio frequency (RF) signals through the antenna 1 and filters the incoming signals with a receiver filter 15. The filtered RF signals are applied to a low noise receiver stage 21. The receiver 20 is coupled to a power supply 19 and is controlled by a microprocessor 16. The receiver 20 preferably includes the filter 15, the low noise receiver stage 21, a second filter 22, a mixer 23 and an intermediate frequency (IF) stage which is not shown. The filter 22 is a bandpass filter, preferably a so-called ceramic filter well known in the art. Its center frequency is the RF frequency and its bandwidth is such that both the frequency RF+2IF and the component RF−2IF are attenuated. Typically, the IF is 45 MHz. Preferably, the low noise receiver stage 21 and the mixer 23 are implemented on an integrated circuit.

Figure 2:
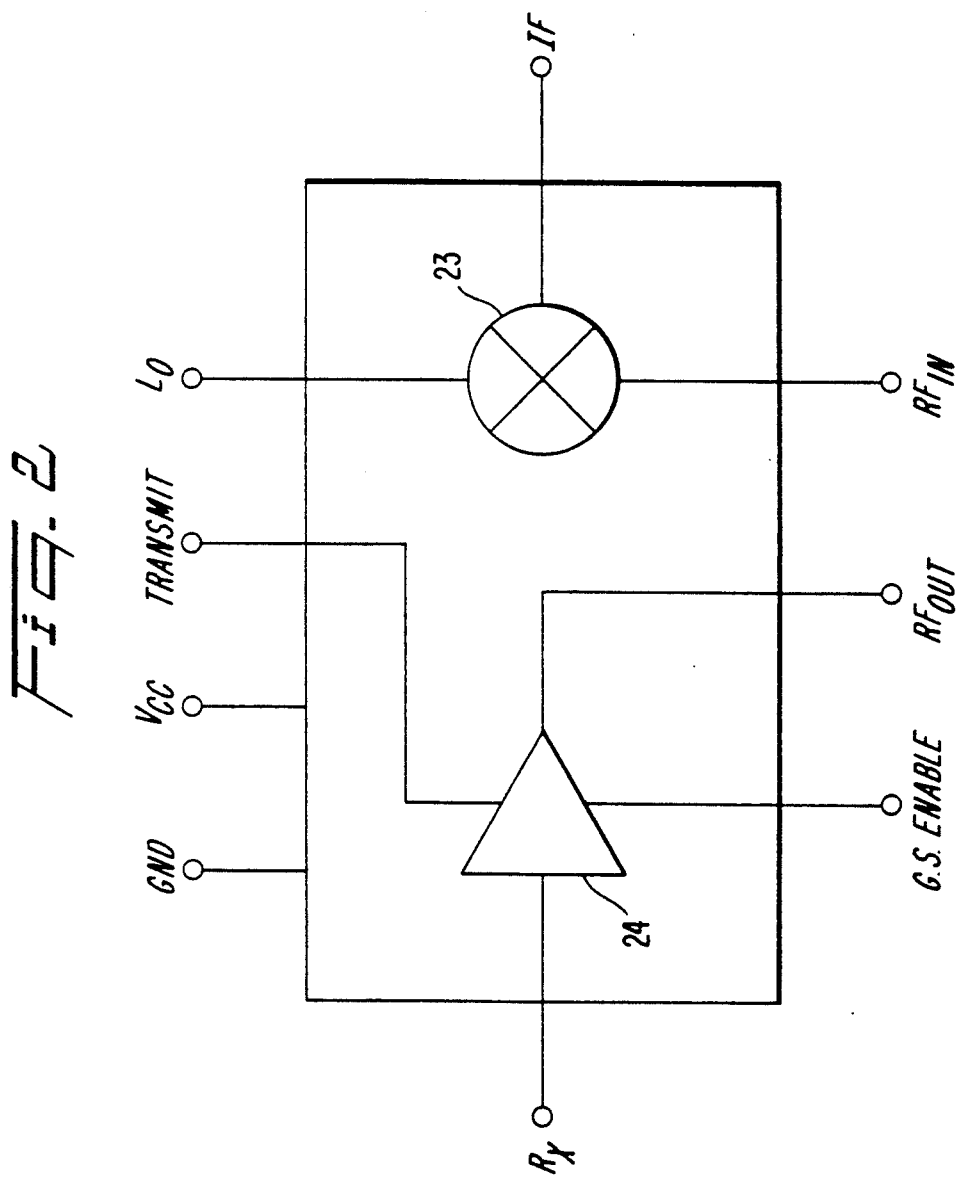
FIG. 2 is a simplified schematic diagram of an integrated circuit which includes a portion of the receiver illustrated in FIG. 1.

Referring now to FIG. 2, a simplified schematic diagram illustrates the portion of the receiver 20 implemented on an integrated circuit. The integrated circuit includes the mixer 23 and an amplifier 24 which is the major component in the low noise receiver stage 21. The input to the amplifier 24 is the filtered RF signal which is designated as $R_x$. The integrated circuit includes a ground terminal GND and an input voltage terminal $V_{cc}$ which are coupled to the power supply 19. An input terminal designated Transmit receives a signal indicating that the transmitter 10 is operating. The integrated circuit includes an input terminal $L_O$ which receives the output signal $L_O$ from the receiver frequency synthesizer 17. The amplifier 24 also includes an input terminal for a signal $GS_{enable}$ which is provided by the microprocessor 16. The $GS_{enable}$ input receives "low" and "high" control signals. When the $GS_{enable}$ signal is "low" the amplifier has no current supply and is substantially disabled. When the $GS_{enable}$ is "high" the amplifier is enabled. The low noise receiver stage 21 also includes the circuitry necessary to match the control signals such as the Transmit signal and $GS_{enable}$ signal to the amplifier 24.

The mobile station, as is conventional in the art, measures an RSSI (Receiver Strength Signal Indicator) signal associated with the IF stage. The RSSI signal has a voltage which is a function of the voltage of the received signal in the antenna. An A/D converter can be used to convert the RSSI signal to a digital format suitable for application to the microprocessor 16. The microprocessor can then determine whether the signal is relatively weak or strong, and whether the signal is strong enough that the amplifier 24 can be disabled.

The output of the amplifier 24 is an output signal designated $RF_{out}$. The signal $RF_{out}$ is provided at an output terminal designated $RF_{out}$ and is applied to the filter 22. The filter 22 filters the signal and applies it as a filtered input signal $RF_{in}$ to the mixer 23 at an input terminal designated $RF_{in}$. The mixer 23 mixes the signals applied at the $L_O$ input terminal and the $RF_{in}$ terminal. The mixer 23 generates an output signal at an output terminal IF that is coupled to the IF stage. The IF stage processes the IF signals in a conventional fashion.

The RF gain stage or amplifier 24 disposed on the integrated circuit illustrated in FIG. 2 preferably conforms to the specifications listed below in Table 1.

TABLE 1

| | |
|---|---|
| Frequency | 860–970 MHz |
| Gain | min, 15 db, but min. −5 db if disabled |
| Nominal Input Level | −10 dBm |
| Maximum Input Level | +5 dBm |
| Input Impedance | 50 ohm, input return loss < −10 dB |
| Output Impedance | 50 ohm, output return loss < −10 dB |
| 1 dB Input Compression Point | −10 dBm min. |
| Gain Flatness Within The Frequency | +/−2 dB |
| Third Order Input Intercept Point | −4 dB min. |
| Reverse Isolation | −15 dB, +5 dB when disabled |
| Noise Figure, NF | typ. 2.5 dB, max 3.0 dB |
| Stability | Unconditionally stable (both input and output) for all frequencies at working |

TABLE 1-continued temperature

The mixer 23 disposed on the integrated circuit illustrated in FIG. 2 preferably conforms to the specifications listed below in Table 2.

TABLE 2

| | |
|---|---|
| RF frequency | 860–970 MHz |
| LO frequency | 900–1050 MHz |
| IF frequency | 40–80 MHz |
| Conversion gain | 7 dB min. |
| Conversion gain flatness within the frequency band | +/−1 dB |
| Noise figure | 7 dB max. |
| Input impedance | 50 ohm, return loss < −10 dB |
| Output impedance (Open collector output) | 1000 ohm nominally (800 ohm as an option) |
| LO port impedance | 50 ohm, return loss < −10 dB |
| LO input power | 0 dBm max. |
| 1 dB input compression point | −3 dBm min. |
| 2nd order input intercept point | +14 dBm min. |
| 3rd order input intercept point | +9 dBm min. |
| Port isolation: | |
| LO-RF | 30 dB min. |
| LO-IF | 6 dB min. |
| RF-IF | 0 dB min. |

The integrated circuit of FIG. 2 preferably conforms to the general specifications listed below in Table 3.

TABLE 3

| | |
|---|---|
| Nominal supply voltage | 4.5–5.0 V |
| Current consumption, transmit mode | max 25 mA |
| Current consumption, standby enable mode | max 10 mA |
| Current consumption, standby disable mode | max 4 mA |
| Operating temperature | −30–+85 deg C. |
| Storage temperature | −65–+100 deg C. |

The low noise receiver stage 21 is designed to have sufficient gain for the requirements of sensitivity according to the systems specification. Such systems specifications include the NMT, EAMPS, and the ETACS. Typically, the requirements for sensitivity are approximately 113 dBm. The low noise receiver stage 21 is also designed to work well in spite of the interfering signal appearing at the input of receiver 20 when the transmitter 10 is on. This feature is obtained by having a sufficiently high receiver "compression point". The "compression point" of an amplifier is when the output signal of the amplifier deviates from an ideal linear function of the input signal by a value such as 1 dBm. Increasing the "compression point", however, means increasing the power consumption of the receiver 20. The low noise receiver stage 21 and amplifier 24 are controlled by the microprocessor 16 such that there are three different modes of operation.

The first mode is called the transmit mode. If the transmitter 10 is sending, it is desireable for the entire circuit including the amplifier 24 to be enabled. As a result, the circuit is in a high current consumption mode. The biasing of the amplifier 24 is relatively high giving good sensitivity and good suppression of the interfering signals from the transmitter 10. During the transmit mode, the control signal which is designated Transmit is enabled, causing the gain stage or amplifier 24 to be enabled.

In the transmit mode there will be typically an interfering input signal detected by the receiver 20 with a frequency of 45 megahertz below the frequency of the desired input signal. This interfering signal results from the transmitter being on. The interfering signal will have a maximum level of +5 dBm. Ideally the circuit should provide the same performance for the desired input signal independent of the presence of the interfering signal. This means that the desired signal must not be degraded due to the presence of the interfering signal. To achieve such a result it is necessary to enable the amplifier 24 and to allow a higher current consumption for the circuit in the transmit mode.

The second mode of operation is called the standby enable mode. When the transmitter 10 is off and the received signal is weak, the amplifier 24 is enabled by the microprocessor 16 in the standby enable mode. The standby enable mode occurs only when the transmitter is off, and the amplifier 24 is biased for relatively low noise and high gain. This is possible with a low compression point if a relatively poor suppression of the interfering signals is accepted.

The third mode of operation for the receiver 20 is preferably called the standby disable mode. This mode occurs when the transmitter 10 is off and the receiver 20 detects a high level input signal. In this mode the amplifier 24 is totally disabled or biased to a relatively low level by the microprocessor 16. Since the input signal has a high level, the amplifier 24 can be switched off, and the remaining sensitivity is sufficient for detecting the digital signal with a relatively low bit error.

The control of the microprocessor 16 over the receiver 20 of the mobile station 9 will now be explained through the use of the simplified flow chart of FIG. 3. The flow chart of FIG. 3 depicts the logic of the software necessary to control the receiver 20. The microprocessor 16 is started at step 30 and performs the step 31 of activating the mobile station 9. In step 32 the microprocessor connects the receiver 20 to a power supply 19. When the receiver 20 is connected to the power supply 19, incoming signals can be received and processed.

The microprocessor 16 determines in step 33 whether the transmitter 10 is on. If the transmitter 10 is on, a Transmit signal is sent to the receiver 20, and the amplifier 24 is biased to a relatively high level. If the microprocessor 16 decides that the transmitter 10 is not on, the microprocessor 16 then performs the step 35 of determining the strength of the received signal. If the received signal is not strong, the microprocessor 16 generates an instruction 36 in order to bias the amplifier 24 to a relatively high level. If the microprocessor 16 in step 35 determines that the received signal is relatively strong, the microprocessor 16 generates an instruction 37 to bias the amplifier 24 to a relatively low level. Since the mobile station 9 at this point is not transmitting, the microprocessor 16 periodically generates an instruction 38 disconnecting the receiver 20 from the power supply 19. By periodically disconnecting the receiver 20 from the power supply 19, substantial amounts of electrical power can be conserved.

The microprocessor 16 then determines in step 39 whether the mobile station 9 is still active. If the mobile station 9 is still active, the microprocessor 16 then reconnects the power supply 19 to the receiver 20 with instruction 32. If the mobile station 9 is to be deactivated, then the microprocessor 16 takes the necessary actions to deactivate the mobile station 9. The deactivation of the mobile station is indicated by step 40 which signifies the end of operation.

While the invention has been described in its preferred embodiments, it is to be understood that the words that have been used are words of description rather than of limitation and the changes within the purview of the appended claims may be made without departing from the true scope and spirit of the invention in its broader aspects.

I claim:

1. In a radio communication apparatus having receiving means and transmitting means, that are responsive to frequency synthesizing means, coupled to a power supply, and controlled by processing means to conserve electrical energy, said receiving means comprises:
    means for sensing the strength of a received radio frequency signal;
    means for amplifying the radio frequency signal, said amplifying means being responsive to the processing means and having three modes;
    in the first mode the amplifying means is biased to a relatively high level when the transmitting means is transmitting,
    in the second mode the amplifying means is biased to a relatively high level when the transmitting means is turned off and the radio frequency signal sensed by said sensing means is a relatively weak signal, and
    in the third mode the amplifying means is substantially disabled when the transmitting means is off and the radio frequency signal sensed by said sensing means is a relatively strong signal; and
    means for mixing an output of the frequency synthesizing means with the radio frequency signal in order to provide an input to an intermediate frequency stage.

2. An apparatus according to claim 1 wherein said amplifying means and said mixing means are disposed upon an integrated circuit.

3. An apparatus according to claim 1 wherein said processing means includes a programmed microprocessor that periodically disconnects the power supply from said receiving means and controls the modes of said amplifying means.

4. An apparatus according to claim 1 wherein said power supply is a battery.

5. An apparatus according to claim 1 wherein the amplifying means includes a compression point which is set to a level sufficient to meet sensitivity requirements of the receiving means.

6. A method of conserving the consumption of electrical energy in a transceiver having a receiving portion and a transmitting portion by controlling an amplifying means of the receiving portion, comprising the steps of:
    sensing the strength of a received signal;
    biasing the amplifying means to a relatively high level, when the transmitting portion of the transceiver is transmitting;
    biasing the amplifying means to a relatively high level, when the transmitting portion is not transmitting and the sensed signal received by the receiving portion is relatively weak; and
    biasing the amplifying means to a relatively low level, when the transmitting portion is not transmitting and the sensed signal received by the receiving portion is relatively strong.

7. A method according to claim 6 wherein the amplifying means includes a compression point which is set to a level sufficient to meet sensitivity requirements of the receiving portion.

* * * * *